US010532489B2

(12) United States Patent
Chen et al.

(10) Patent No.: US 10,532,489 B2
(45) Date of Patent: Jan. 14, 2020

(54) POWER TOOL

(71) Applicant: Nanjing Chervon Industry Co., Ltd., Nanjing (CN)

(72) Inventors: Weipeng Chen, Nanjing (CN); Hongwei Wang, Nanjing (CN); Xiangqing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 106 days.

(21) Appl. No.: 15/804,278

(22) Filed: Nov. 6, 2017

(65) Prior Publication Data
US 2018/0126593 A1 May 10, 2018

(30) Foreign Application Priority Data

| Nov. 7, 2016 | (CN) | 2016 1 0976748 |
| Mar. 6, 2017 | (CN) | 2017 2 0212445 U |
| Mar. 6, 2017 | (CN) | 2017 2 0215245 U |
| Aug. 18, 2017 | (CN) | 2017 1 0709777 |

(51) Int. Cl.
| B28D 1/04 | (2006.01) |
| B23D 47/12 | (2006.01) |
| B25F 5/02 | (2006.01) |
| B28D 7/00 | (2006.01) |

(52) U.S. Cl.
CPC .............. *B28D 1/04* (2013.01); *B23D 47/12* (2013.01); *B25F 5/02* (2013.01); *B28D 7/00* (2013.01)

(58) Field of Classification Search
CPC .. B23D 47/12; B25F 5/02; B28D 1/04; B28D 7/00

USPC ........................................................... 30/388
See application file for complete search history.

(56) References Cited

U.S. PATENT DOCUMENTS

| 5,559,674 A * | 9/1996 | Katsui | H01L 23/40 361/697 |
| 5,995,367 A * | 11/1999 | Smith | H01L 23/467 165/78 |
| 8,159,819 B2 * | 4/2012 | Memon | G06F 1/20 165/185 |

(Continued)

FOREIGN PATENT DOCUMENTS

| CN | 106411187 A | 2/2015 | |
| CN | 105207549 A | 12/2015 | |
| WO | WO-2017084614 A1 * | 5/2017 | ............. B24B 23/06 |

*Primary Examiner* — Ghassem Alie
*Assistant Examiner* — Bharat C Patel
(74) *Attorney, Agent, or Firm* — Greenberg Traurig, LLP

(57) ABSTRACT

A power tool includes a housing, a saw blade for cutting a workpiece, a motor for driving the saw blade to rotate about a first axis, a circuit board for controlling the motor, a heat sink for cooling, and a base plate being formed with a flat surface for contacting with the workpiece during cutting. The housing includes a first containing portion being formed with a first container for containing the motor, a second containing portion extended along a direction substantially parallel to the flat surface from one of the two ends of the first containing portion along a direction substantially perpendicular to the first axis. The second containing portion is formed with a second container which is communicated with the first container. The circuit board and the heat sink are disposed in the second container.

13 Claims, 17 Drawing Sheets

(56) References Cited

U.S. PATENT DOCUMENTS

| | | | | |
|---|---|---|---|---|
| 8,928,261 | B2* | 1/2015 | Haga | B25B 21/002 |
| | | | | 318/400.01 |
| 9,364,906 | B2* | 6/2016 | Abe | B23D 47/12 |
| 9,559,628 | B2* | 1/2017 | Sergyeyenko | H02P 27/00 |
| 9,718,180 | B2* | 8/2017 | Hester | B25F 5/008 |
| 2006/0186743 | A1* | 8/2006 | Habel | B25D 17/20 |
| | | | | 310/58 |
| 2014/0355218 | A1* | 12/2014 | Vinciarelli | H01R 43/205 |
| | | | | 361/728 |
| 2015/0026985 | A1* | 1/2015 | Yamaguchi | B23D 45/16 |
| | | | | 30/123 |
| 2015/0328796 | A1* | 11/2015 | Okouchi | B27B 9/02 |
| | | | | 30/377 |
| 2017/0106522 | A1* | 4/2017 | Coates | H02K 11/33 |
| 2017/0110935 | A1 | 4/2017 | Oktavec et al. | |
| 2017/0120435 | A1* | 5/2017 | Palich | B23D 45/044 |
| 2017/0126051 | A1 | 5/2017 | Cox et al. | |
| 2018/0076745 | A1* | 3/2018 | Cox | H02P 6/28 |

\* cited by examiner

US 10,532,489 B2

POWER TOOL

RELATED APPLICATION INFORMATION

This application claims the benefit under 35 U.S.C. § 119(a) of Chinese Patent Application No. CN 201610976748.4, filed on Nov. 7, 2016, Chinese Patent Application No. CN 201720215245.5, filed on Mar. 6, 2017, Chinese Patent Application No. CN 201720212445.5, filed on Mar. 6, 2017, Chinese Patent Application No. CN 201710709777.9, filed on Aug. 18, 2017, each of which is incorporated herein by reference in its entirety.

FIELD OF THE DISCLOSURE

The present disclosure relates generally to power tools.

BACKGROUND OF THE DISCLOSURE

Tile or circular saws are a kind of power tool which have a high rotational speed and which can be used to cut tiles and stones.

With currently known saws, a housing part or parts for placing the circuit board and the heat sink are arranged in a manner to facilitate gripping and/or operating of the saw by a user and the cooling or heat dissipation effect of a motor is deeply limited by the arrangement of the circuit board and the heat sink.

The statements in this section merely provide background information related to the present disclosure and may not constitute prior art.

SUMMARY

In one aspect of the disclosure, a power tool includes a housing, a saw blade for cutting a workpiece, a motor for driving the saw blade to rotate about a first axis, a circuit board for controlling the motor, a heat sink for cooling, and a base plate being formed with a flat surface for contacting with the workpiece during cutting. The housing includes a first containing portion being formed with a first container for containing the motor, a second containing portion extended along a direction substantially parallel to the flat surface from one of the two ends of the first containing portion along a direction substantially perpendicular to the first axis. The second containing portion is formed with a second container which is communicated with the first container, the circuit board and the heat sink are disposed in the second container.

Further areas of applicability will become apparent from the description provided herein. It should be understood that the description and specific examples are intended for purposes of illustration only and are not intended to limit the scope of the present disclosure.

Figure 1:
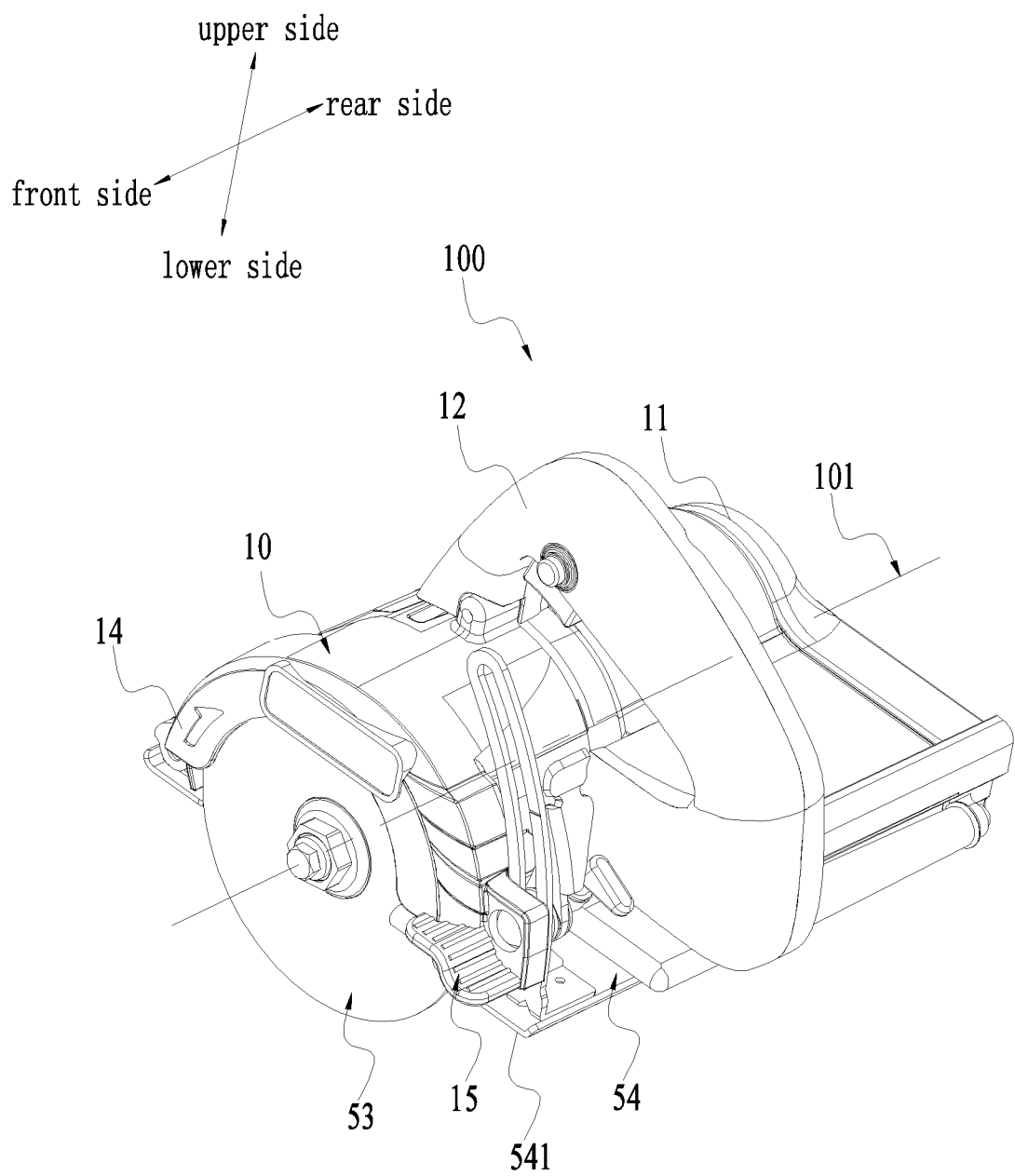
FIG. 1 is a schematic view of an exemplary electric saw.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

Referring to FIGS. 1-9, a first example of a power tool, for example an electric saw, is shown. Specifically, the electric saw 100 is a tile saw for cutting tiles and stones.

Referring to FIGS. 1-7, the electric saw 100 includes a housing 10, a motor 51, a transmission assembly 52, a saw blade 53, a base plate 54, a circuit board 55 and a heat sink 20. The motor 51 is used to drive the saw blade 53 to rotate about a first axis 101. The transmission assembly 52 is used to transmit power between the motor 51 and the saw blade 53. The base plate 54 is formed with a flat surface 541 for contacting with a workpiece. The circuit board 55 is used to control the motor 51. The heat sink 20 is used to cool the circuit board 55, the motor 51 and other heating elements. When the saw blade 53 is driven by the motor 51 to rotate about the first axis 101, the saw blade 53 is able to cut the workpiece contacting with the flat surface 541. The motor 51 of the electric saw 100 is an inner rotor brushless motor 51. The electric saw 100 has an output power that is greater than 3000 W.

The housing 10 is configured to form the shape of the electric saw 100. The motor 51, the transmission assembly 52, the saw blade 53, the circuit board 55 and the heat sink 20 are contained in the housing 10. The housing 10 includes a main body portion 11 and a handle portion 12. The handle portion 12 is extended outward from the main body portion 11. The motor 51 and the saw blade 53 are disposed on two sides of the handle portion 12.

For illustrating conveniently, a side where the saw blade 53 is disposed in a direction of the first axis 101 is defined as a front side, and a side where the motor 51 is disposed is defined as a rear side. A side where the base plate 54 is disposed in a direction that is substantially perpendicular to the base plate 54 is defined as a lower side, and the other side is defined as an upper side.

Specifically, a hole 12a is formed through the main body portion 11 and the handle portion 12, which allows a hand of a user to pass from one side to the other side so as to grip the handle portion 12. A button 12b is disposed at the handle portion 12 for the user to press so as to operate the electric saw 100 when his hand grips the handle portion 12.

The main body portion 11 of the housing 10 includes a first containing portion 111 which is formed with a first container 1111 and a second containing portion 112 which is formed with a second container 1121. The first container 1111 and the second container 1121 are communicated with each other.

The motor 51 is disposed in the first container 1111. The motor 51 includes a motor shaft 511 for outputting power. In is noted that, as long as the main part of the motor 51 is disposed in the first container 1111, the motor 51 can be understood as being contained in the first container 1111. For example, the motor shaft 511 is protruded out of the first container 1111 and the other part of the motor 51 is disposed in the first container 1111, which also can be understood as the motor 51 being contained in the first container 1111 for the person skilled in the art.

The heat sink 20 and the circuit board 55 are disposed in the second container 1121. The second containing portion 112 is extended from the first containing portion 111 along a direction that is substantially parallel to the flat surface 541. The second containing portion 112 is located on one of the two ends of the first containing portion 111 in a direction that is substantially perpendicular to the first axis 101.

In the direction that is substantially perpendicular to the flat surface 541, the second containing portion 112 is disposed in the center of the motor 51 and in the center of the first containing portion 111. It is noted that the second containing portion 112 being disposed in the center of the motor 51 means that the second containing portion 112 is aligned with the motor shaft 511 of the motor 51 in the direction that is substantially perpendicular to the flat surface 541. The first containing portion 111 and the second containing portion 112 are aligned with each other on their ends which are removed from the saw blade in a direction substantially parallel to the first axis 101. So, a whole constituted by the first containing portion 111 and the second containing portion 112 is easier to manufacture and an inner space is larger, so that the heat sink 20 and the circuit board 55 with a relatively larger size are easy to dispose therein, which is further adapted to provide the electric saw 100 with high power. The position of the second containing portion 112 relative to the first containing portion 111 and the specific structure of the second containing portion 112 allow the heat sink 20 to cool the motor more efficiently.

Otherwise, a projection of the second containing portion 112 in a plane that is substantially perpendicular to the first axis 101 is located out of a projection of the hole 12a in the plane. Thus, the position of the second containing portion 112 is so arranged that it cannot interfere with the grip to the handle portion 12.

Further, in the direction that is substantially perpendicular to the flat surface 541, a distance L1 from the second containing portion 112 to the flat surface 541 is greater than or equal to 8 mm and less than or equal to 30 mm. Thus, when the saw blade 53 cuts the workpiece, water thrown out from the lower edge of the saw blade 53 is inhibited from being thrown to the containing portion 112.

More specifically, in the plane that is substantially perpendicular to the first axis 101, the first containing portion 111 is a circular structure which can be matched with the shape of the motor 51. In this plane, the second containing portion 112 is a rectangular structure. Further, the whole constituted by the first containing portion 111 and the second containing portion 112 is a key-shaped structure.

Figure 2:
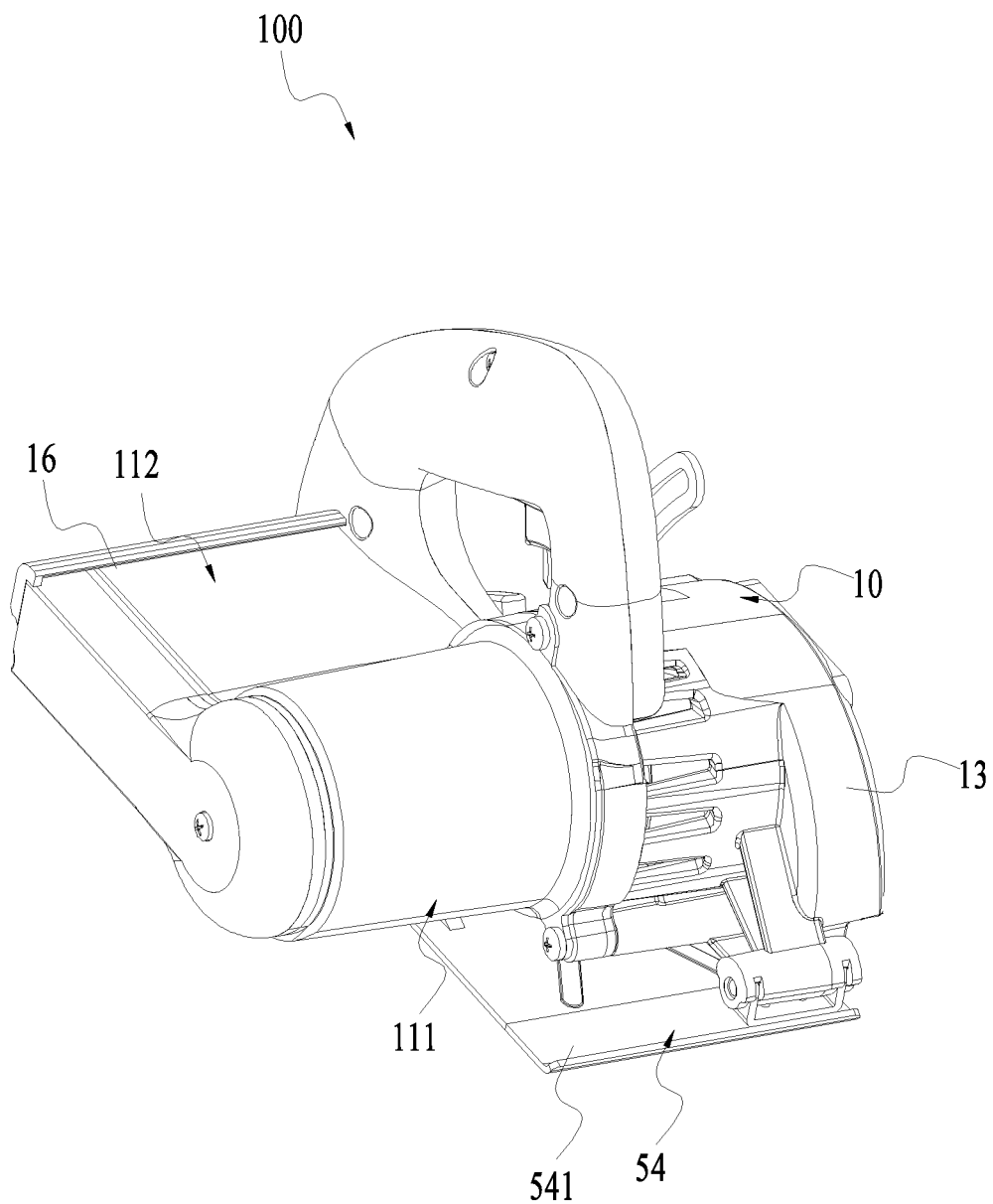
FIG. 2 is another schematic view of the electric saw in FIG. 1.
Figure 3:
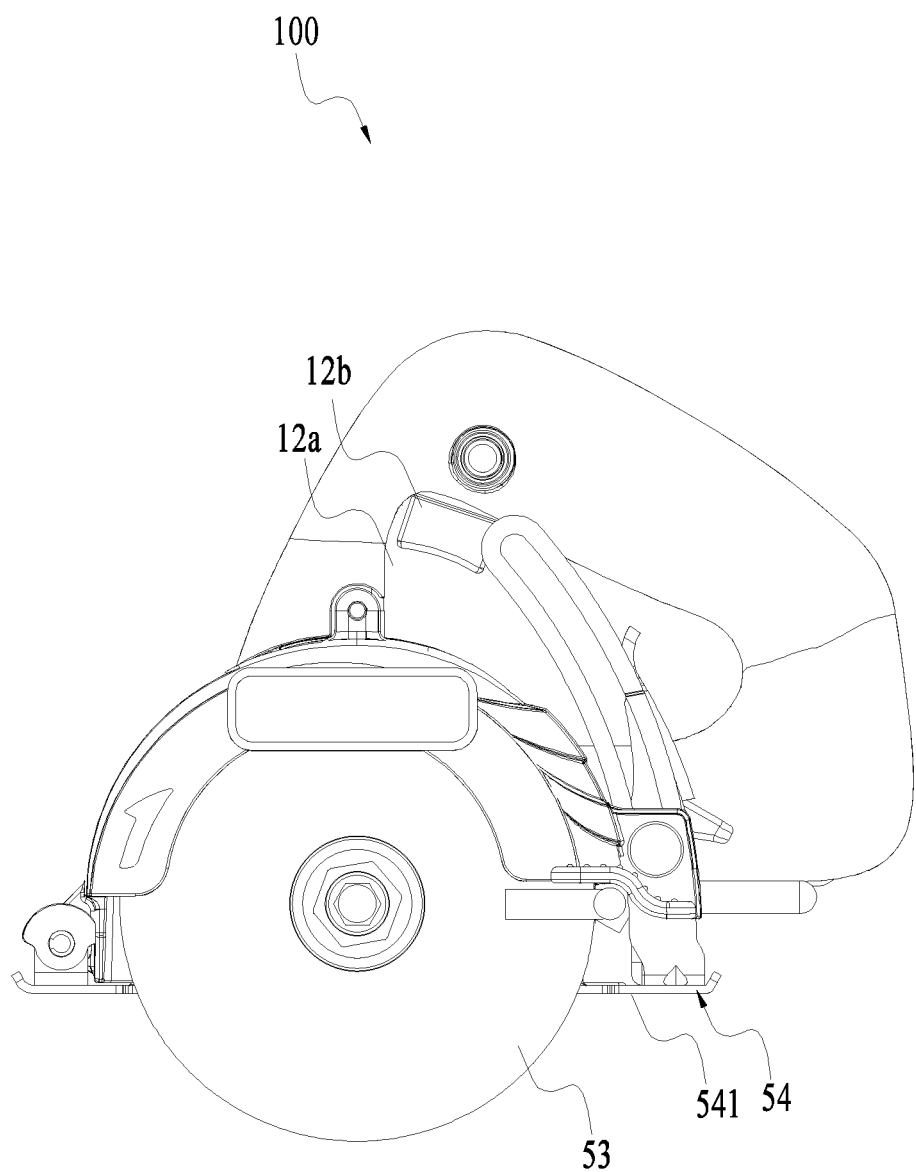
FIG. 3 is a front view of the electric saw in FIG. 1.
Figure 6:
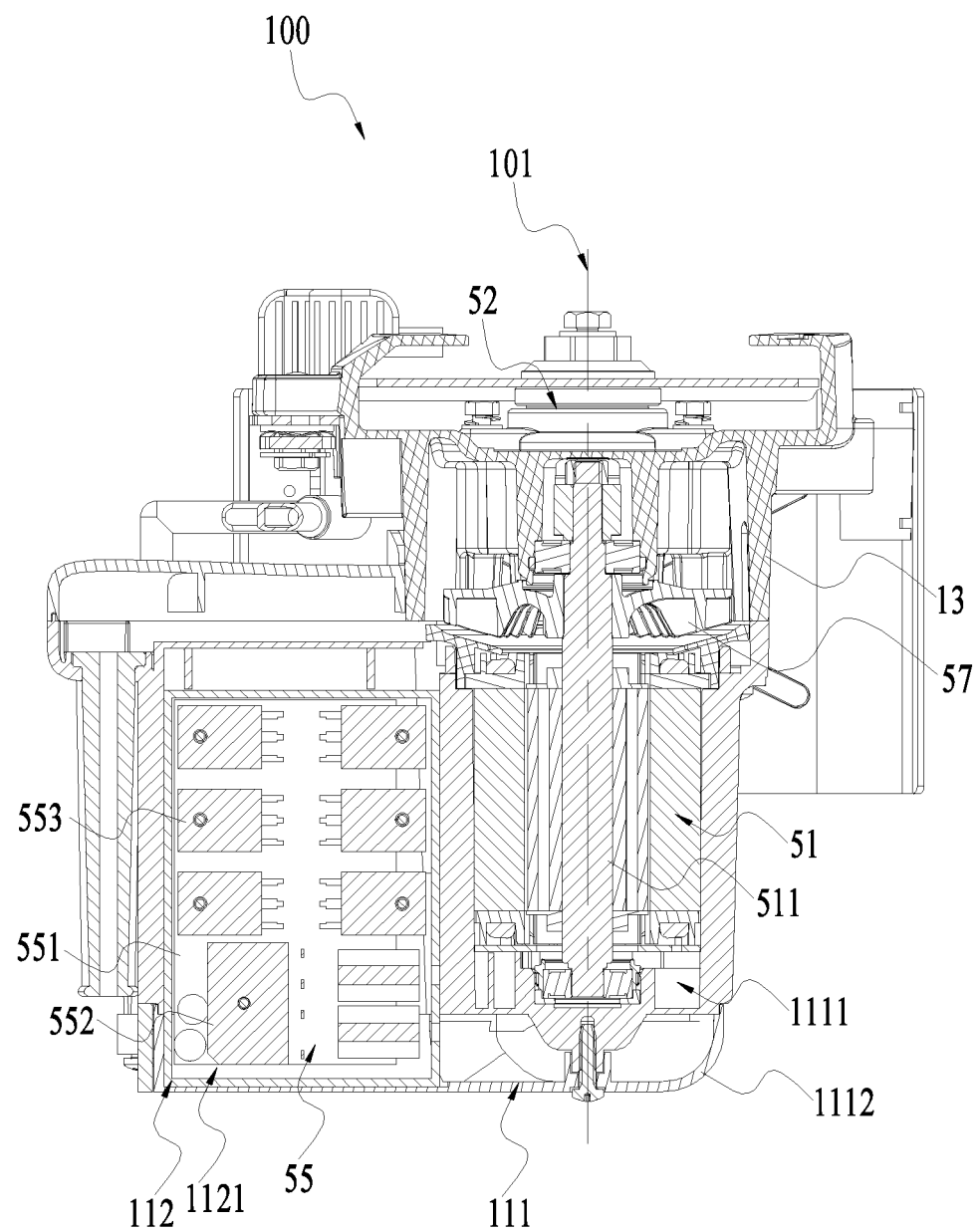
FIG. 6 is a section view of the electric saw in FIG. 5 along line A-A.
Figure 8:
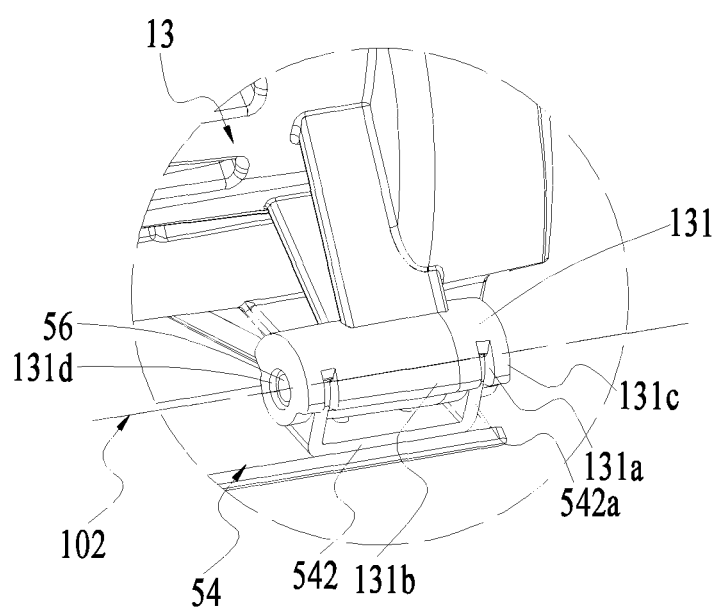
FIG. 8 is an enlarged view of a part of the structure in FIG. 2.

Referring to FIGS. 2, 6 and 8, the housing 10 further includes a gear box 13. The transmission mechanism 52 is disposed in the gear box 13. The gear box 13 includes a first connecting element 131. The base plate 54 is connected with a second connecting element 542. Through the engagement of the first connecting element 131 and the second connecting element 542, the base plate 54 is rotatably connected with the housing 10 about a second axis 102 that is substantially parallel to the first axis 101.

Specifically, the first connecting element 131 is formed with two grooves 131a, and the second connecting element 542 is formed with two bulges 542a which can be inserted in the grooves 131a respectively. In can be understood that the number of the grooves 131a and the bulges 542a can be more than two.

The first connecting element 131 includes an inserting portion 131b and a limiting portion 131c. The inserting portion 131b can be inserted in a space formed between the two bulges 542a of the second connecting element 542. The number of the limiting portion 131c is two. The first connecting element 131 can be limited by the two limiting portions 131c from two sides of a whole constituted by the two bulges 542a in a direction of the second axis 102. The first connecting element 131 is further formed with an axle hole 131d. The axle hole 131d goes through the first connecting element 131 in the direction of the second axis 102. The second connecting element 542 is formed with a through hole which is connected with the axle hole 131d when it is connected with the first connecting element 131. The electric saw 100 further includes a C-shaped pin 56 passing through the axle hole 131d and the through hole.

Figure 4:
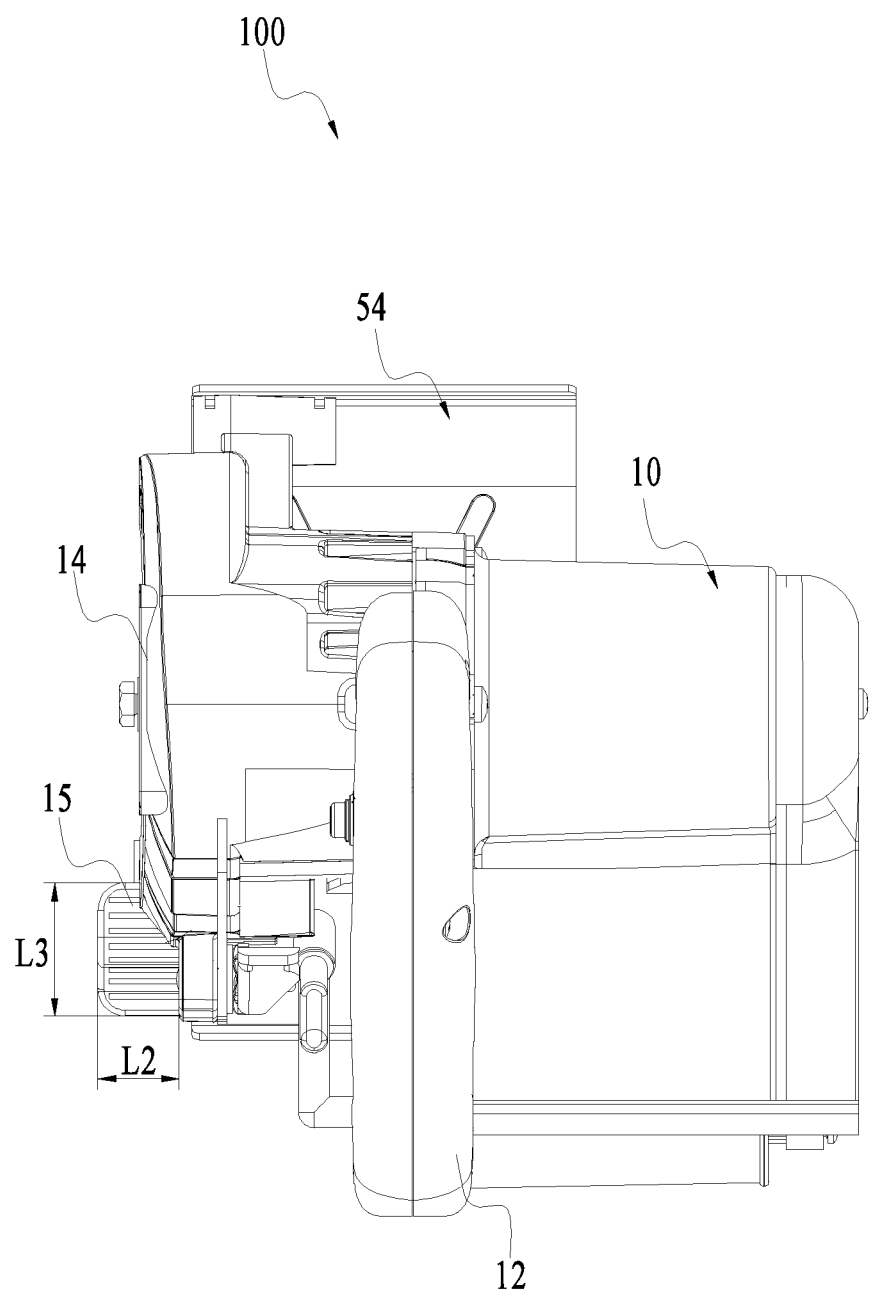
FIG. 4 is a top view of the electric saw in FIG. 1.
Figure 5:
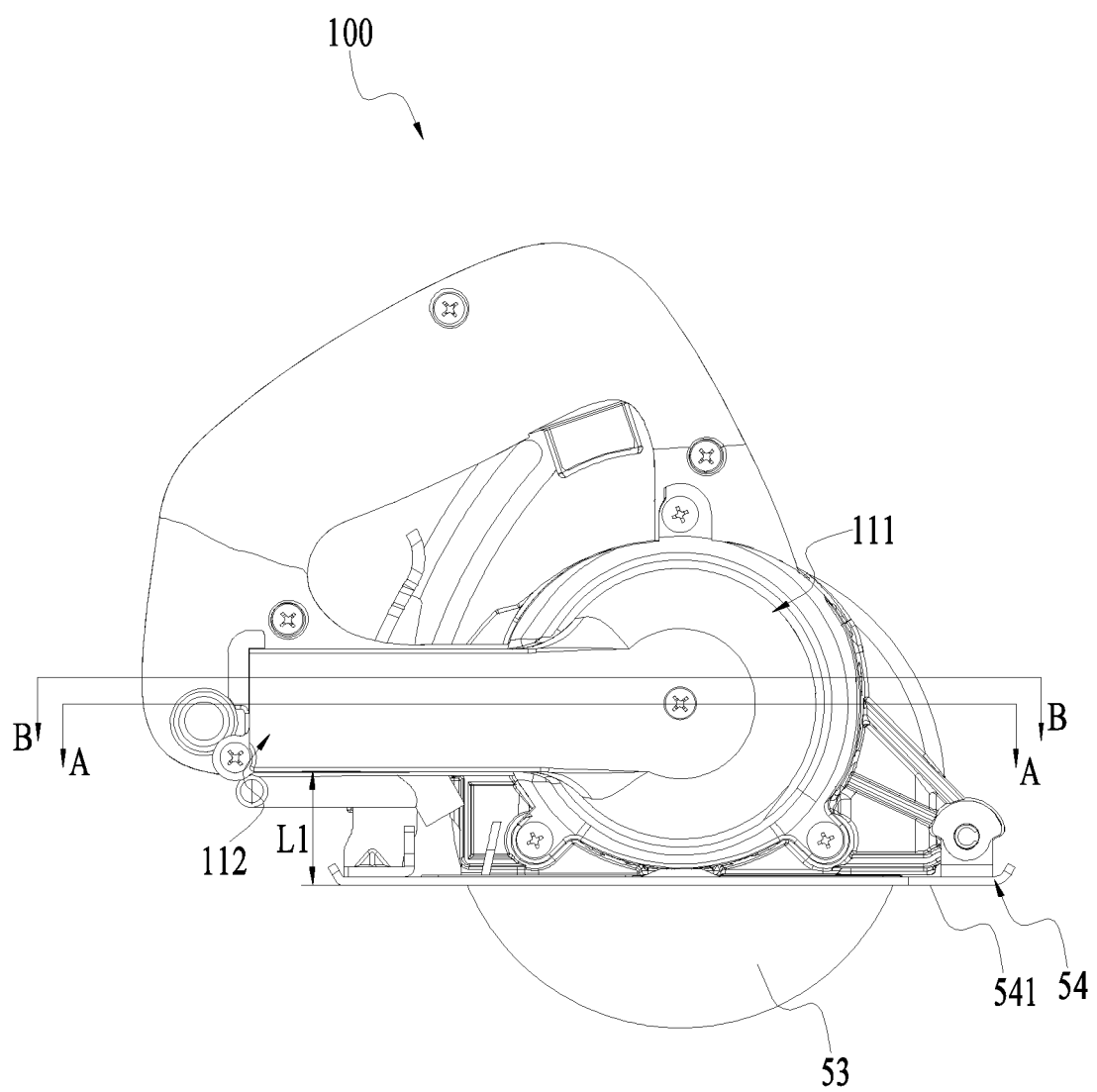
FIG. 5 is a rear view of the electric saw in FIG. 1.

Referring to FIGS. 1 and 4, the housing 10 further includes a guard 14 which is used to surround the saw blade 53 partially so as to protect the user. An auxiliary gripping portion 15 for the user to grip is extended toward a direction that is departed from the saw blade 53 from one side of the guard 14 that is removed from the motor 51. In the direction that is substantially parallel to the first axis 101, the auxiliary gripping portion 15 is at least partially located on the side of the guard 14 that is removed from the motor 51. Thereby, when the user operates the electric saw 100, the user grips the handle portion 12 with one hand and pinches the auxiliary gripping portion 15 with their thumb and index finger of the other hand, so that the electric saw 100 is held steadily. In the direction that is substantially parallel to the first axis 101, the auxiliary gripping portion 15 and the handle portion 12 are located on two sides of the saw blade 53 respectively. Further, the auxiliary gripping portion 15 and the motor 51 are located on the two sides of the handle portion 12, so that the electric saw 100 can be easier to grip for the user.

The auxiliary gripping portion 15 has a size L2 in the direction that is substantially parallel to the first axis 101 which is greater than or equal to 10 mm and less than or equal to 30 mm. The auxiliary gripping portion 15 has a size L3 in a direction that is substantially parallel to the flat surface 541 and perpendicular to the first axis 101 which is greater than or equal to 10 mm and less than or equal to 40 mm. Thus, the size of the auxiliary gripping portion 15 is adapted to the thumb of the user, which is not too big and can reduce the block of the user's view. And the size of the auxiliary gripping portion 15 is not too small, which can avoid the auxiliary gripping portion 15 from sliding from the thumb or the index finger of the user during operation.

Figure 7:
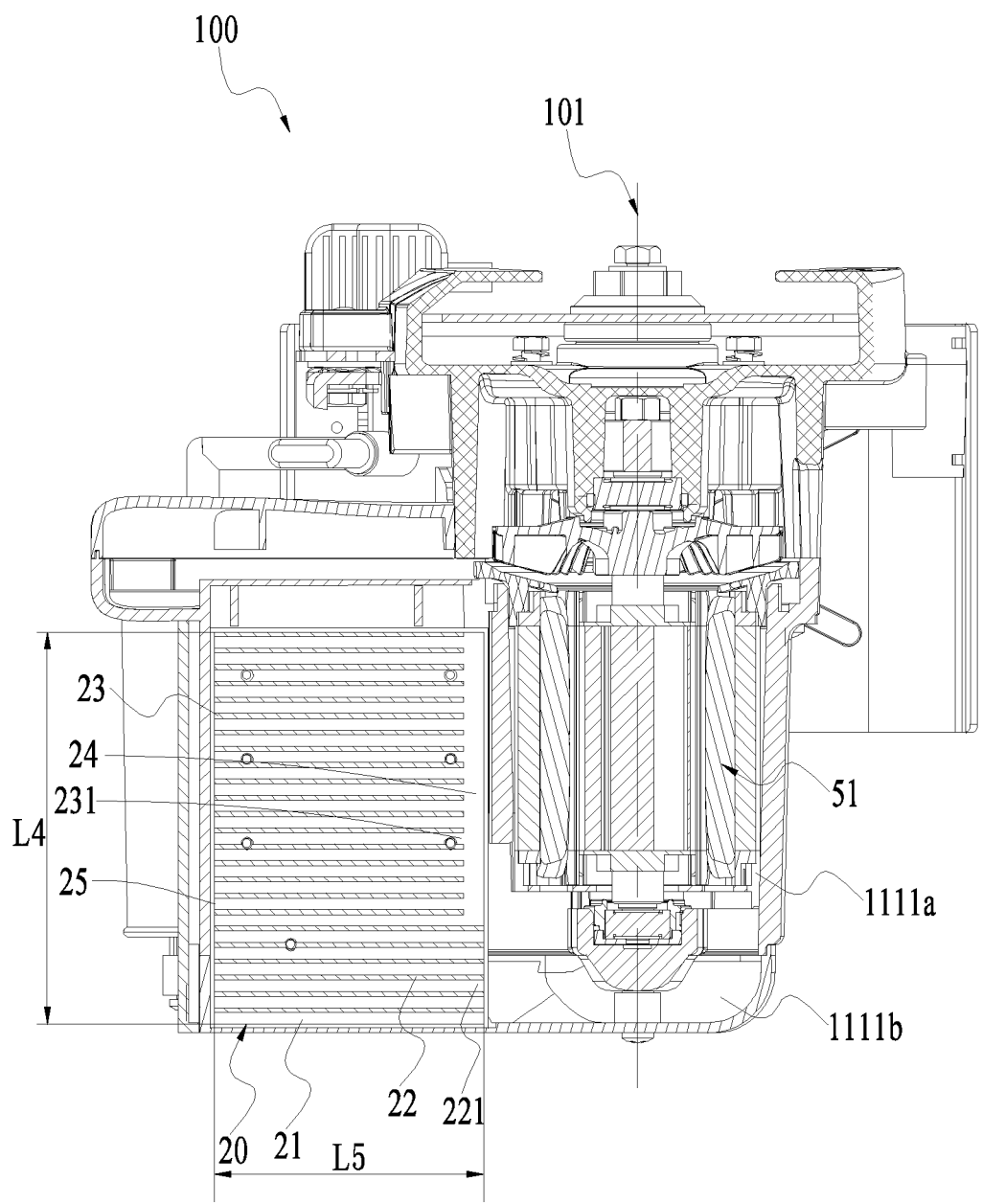
FIG. 7 is a section view of the electric saw in FIG. 5 along line B-B.
Figure 9:
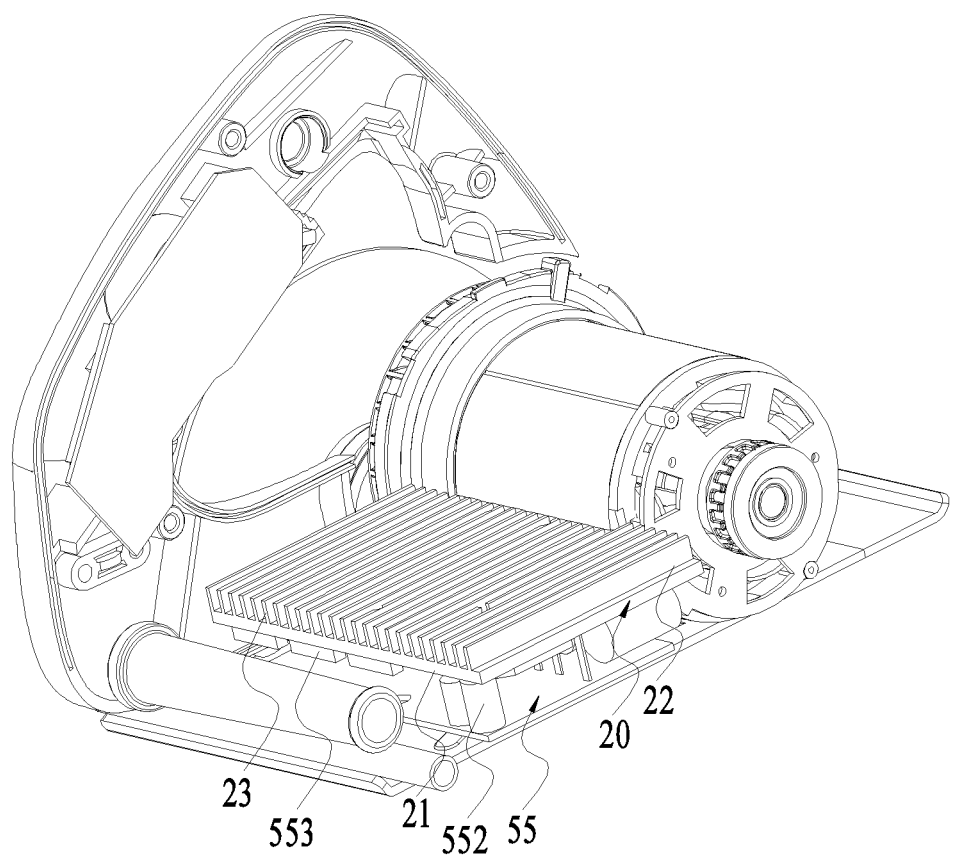
FIG. 9 is a schematic view of the electric saw in FIG. 1 wherein a first containing portion and a second containing portion are removed.
Figure 10:
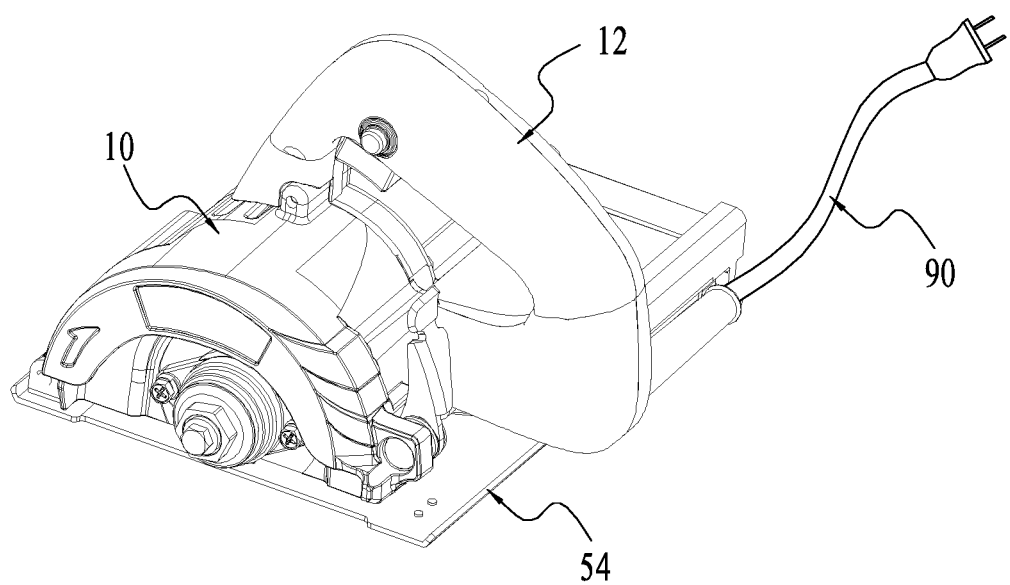
FIG. 10 is a schematic view of a second exemplary power tool.
Figure 11:
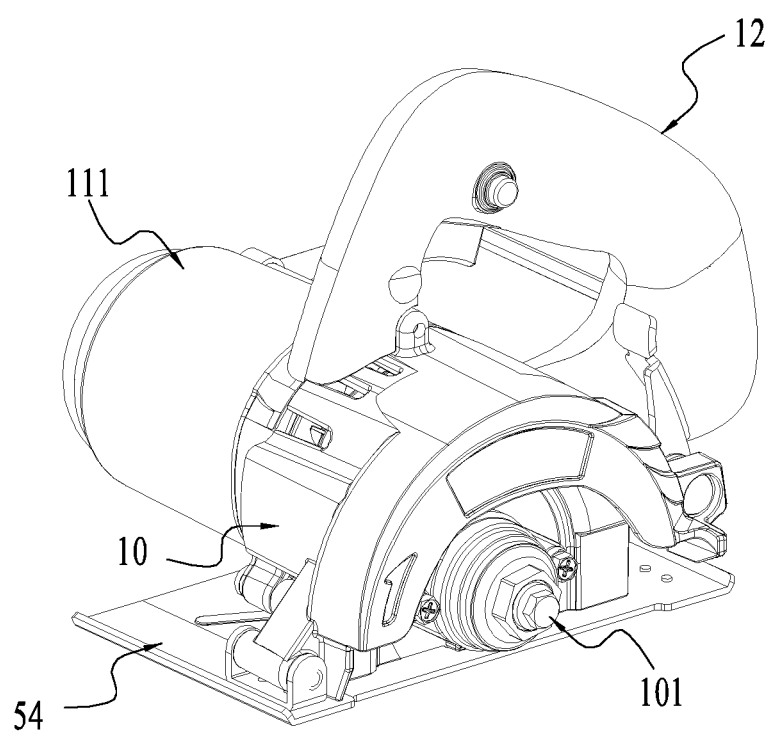
FIG. 11 is another schematic view of the power tool in FIG. 10.

Referring to FIGS. 6-7 and 9, the heat sink 20 and the circuit board 55 are arranged in turn in the second container 1121 along the direction substantially perpendicular to the flat surface 541. Further, the heat sink 20 is disposed above the circuit board 55. The electric saw 100 includes a fan 57 disposed between the motor 51 and the saw blade 53. The fan 57 can be driven to rotate by the motor 51 so as to generate a cooling airflow flowing towards the circuit board 55, the heat sink 20 and the motor 51. The second container 1121 is communicated with the first container 1111, so the cooling airflow can be guided by the heat sink 20 in the second container 1121 to the first container 1111 so as to cool the motor 51. In order to make the cooling airflow flow to the motor 51 along the direction substantially parallel to the first axis 101, a gap is formed between a rear wall of the first container 1111 that is removed from the saw blade 53 in the direction of the first axis 101 and a rear end of the motor 51 that is removed from the saw blade 53 in the direction of the first axis 101. The gap allows the cooling airflow to be guided to the motor 51. Here, the first container 1111 is divided into two portions in the direction of the first axis 101 which are a first portion 1111a and a second portion 1111b. The first portion 1111a is a portion of the first container 1111 for containing the motor 51. The second portion 1111b is a portion of the first container 1111 where the gap is located.

The heat sink 20 has a size in the direction substantially parallel to the first axis 101 that is approximately equal to a size of the first container 1111 in the direction substantially parallel to the first axis 101. Specifically, the heat sink 20 includes a base board 21, first-type ribs 22 and second-type ribs 23. In the direction that is substantially parallel to the flat surface 541 and perpendicular to the first axis 101, the second-type ribs 23 have an end close to the motor 51 which is shorter than the first-type ribs 22. The base board 21 is extended in the direction that is substantially parallel to the flat surface 541. The first-type ribs 22 and the second-type ribs 23 are disposed on the base board 21. The first-type ribs 22 have a first-type air outlet 221. In the direction that is substantially parallel to the first axis 101, the first-type air outlet 221 is aligned with one side of the motor 51 that is removed from the saw blade 53. That is, the first-type air outlet 221 is aligned with the second portion 1111b of the first container 1111 in the direction that is substantially parallel to the first axis 101. The second-type ribs 23 have a second-type air outlet 231. The second-type air outlet 231 is aligned with a portion of the first container 1111 for containing the motor 51 in the direction that is substantially parallel to the first axis 101. That is, the second-type air outlet 231 is aligned with the first portion 1111a of the first container 1111. Otherwise, because the end of the second-type ribs 23 close to the motor 51 is shorter than the first-type ribs 22, a guiding channel 24 is formed on the base board 21. The guiding channel 24 is formed on one side of the second-type ribs 23 that is close to the motor 51. The cooling airflow flowing out from the second-type air outlet 231 can be guided by the guiding channel 24 to the side of the motor 51 that is removed from the saw blade 53, that is flowing to the second portion 1111b of the first container 1111. So, the cooling airflow flowing out from the second-type air outlet 231 can flow to the motor along the direction of the first axis 101. The first-type ribs 22 can guide the cooling airflow to flow out of the first-type air outlet 221 and then flow to the second portion 1111b directly, so the cooling airflow passing the first-type ribs 22 have more air volume. In this example, the first-type ribs 22 and the second-type ribs 23 are extended along the direction that is substantially perpendicular to the first axis 101. Thus, the first-type ribs 22 and the second-type ribs 23 can have the same air inlet 25. The air inlet 25 has a size L4 in the direction that is substantially parallel to the first axis 101 which is greater than a size L5 of the first-type air outlet 221 in the direction that is substantially parallel to the first axis 101. Referring to FIGS. 2 and 6, an airflow inlet 16 is formed on a position of the housing 10 which is corresponded to the air inlet 25. The airflow inlet 16 is communicated with the air inlet 25. A labyrinth inlet channel can be formed between the airflow inlet 16 and the air inlet 25 so as to prevent dust from entering the second container 1121. In can be understood that the first-type ribs 22 and the second-type ribs 23 can be extended along a direction that is obliquely intersected with the first axis 101, so that a better cooling effect can be obtain. Otherwise, an arcuate guiding portion 1112 is formed on the rear wall of the first container 111 that is removed from the motor 51 in the direction of the first axis 101, which is able to guide the cooling airflow of the first container 111 to the motor 51.

The circuit board 55 is provided with electronic elements which can generate heat so as to raise the temperature during operation of the tool. For electronic elements with high heating power in particular, they is more need for cooling. Specifically, the circuit board 55 includes a circuit substrate 551, a first-type electronic element 552 and a second-type electronic element 553. The circuit substrate 551 is extended in the direction substantially parallel to the flat surface 541. The first-type electronic element 552 has a heating power which is greater than or equal to a predetermined heating power, and the second-type electronic element 553 has a heating power which is less than the predetermined heating power. So, the first-type electronic element 552 is disposed on a first position of the circuit substrate 551 which corresponds to the first-type ribs 22, and the second-type electronic element 553 is disposed on a second position of the circuit substrate 551 which corresponds to the second-type ribs 23. That is, the first-type electronic element 552 is disposed right below the first-type ribs 22, and the second-type electronic element 553 is disposed right below the second-type ribs 23. Thereby, the first-type electronic element 552 with a higher heating power can be cooled more efficiently.

Referring to FIGS. 10-14, a second example of a power tool, for example a hand-held tile saw, is shown. The hand-held saw includes a housing 10, a handle 12, a base plate 54, a brushless motor 51 and a circuit board 55 including a controller 140 therein.

The hand-held saw further includes a saw blade, an output shaft 101 provided with the saw blade, a motor shaft 511 of the motor 51. The base plate 54 is configured to contact with a workpiece to be cut. The saw blade has a cutting surface which is substantially parallel to a cutting direction. The output shaft 101 is connected with the motor shaft 511 through a transmission assembly. In this example, the output shaft 101 is substantially parallel to the motor shaft 511. The transmission assembly can be one stage or more than two stages so as to provide speed down, speed up or constant speed transmission between the output shaft 101 and the motor shaft 511. In other examples, the output shaft 101 can be set not to be parallel to the motor shaft 511. For example, the output shaft 101 may be perpendicular to the motor shaft 511 or obliquely intersected with the motor shaft 511.

Figure 12:
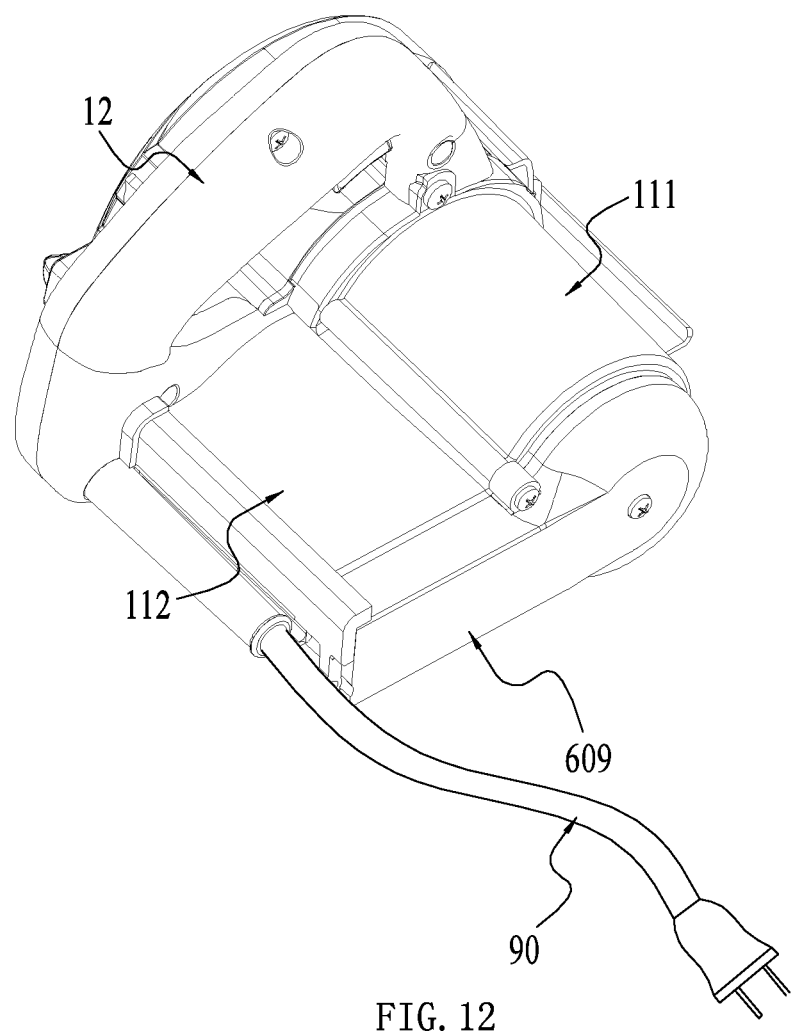
FIG. 12 is another schematic view of the power tool in FIG. 11.
Figure 13:
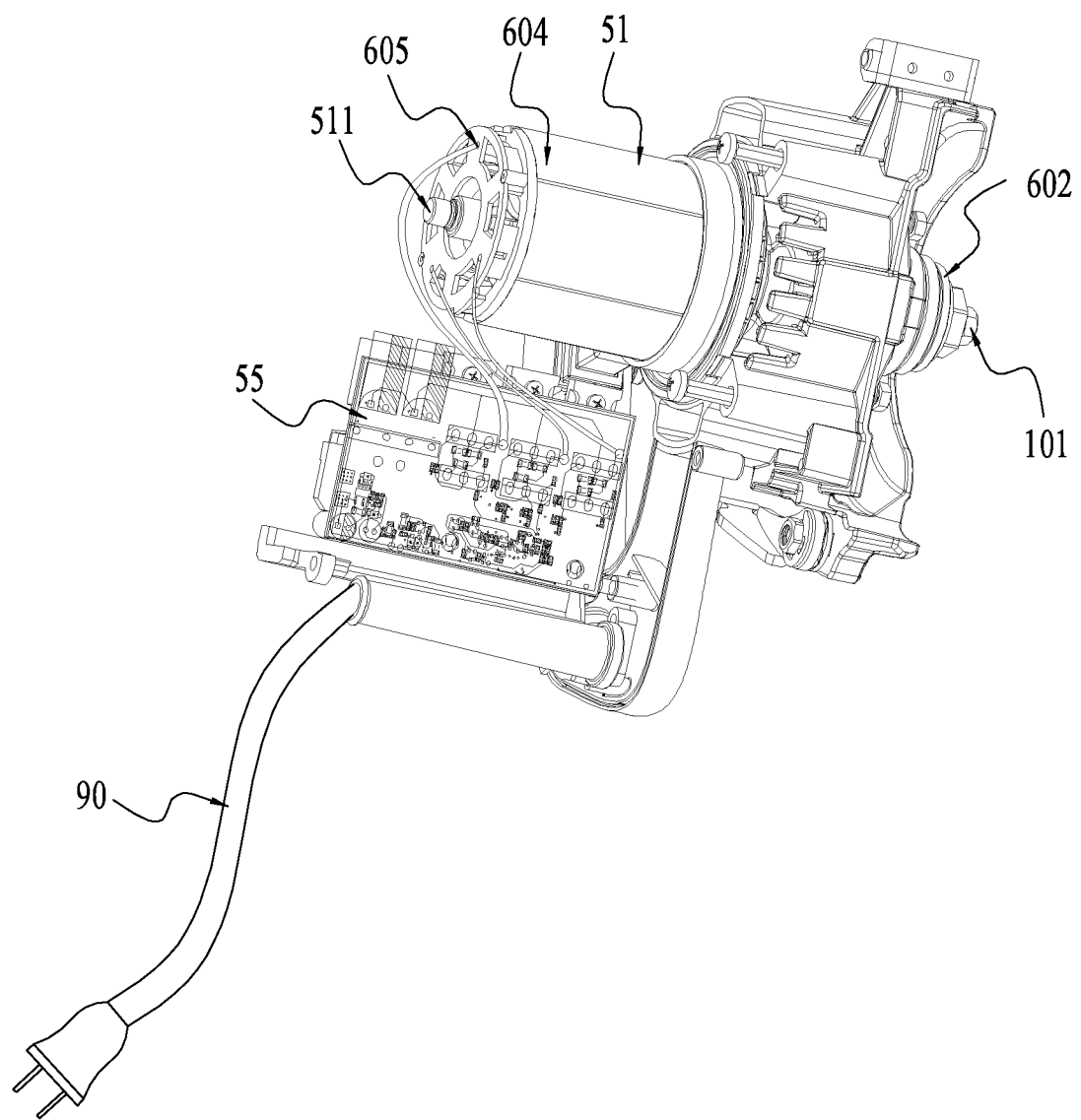
FIG. 13 is a schematic view showing a part of the power tool in FIG. 12.

Referring to FIGS. 12-13, the housing 10 includes a container. The brushless motor 51 is mounted in the housing 10. Specifically, the container of the housing 10 is divided into a motor housing 111 and a non-motor housing 112. The brushless motor 51 is mounted within the motor housing 111. The motor housing 111 has a narrow shape which is adapted to the shape of the brushless motor 51. The circuit board 55 and a motor driving circuit 106 are mounted within the non-motor housing 112. The non-motor housing 112 has a flat box shape which is adapted to the circuit board 55 and the motor driving circuit 106.

In this example, the brushless motor 51 includes a rotor, a stator having at least a three-phase winding 605 and the above-described motor shaft 511. The rotor is mounted onto the motor shaft 511. In the prior art, one or more electromagnetic induction elements or sense magnets are arranged along the motor shaft at a rear end of the motor shaft, or on the rear side of the motor rotor. The one or more sense magnets were affixed to the motor shaft, and a positional sensor board including one or more sensors is disposed adjacent to the one or more sense magnets. The position sensor board or sensors cooperate with the one or more sense magnets or similar sense elements to sense rotational position of the motor shaft or the motor rotor so as to enable the controller to generate a drive signal to drive the rotation of the motor according to the sensed position of the motor shaft or motor rotor.

As shown in FIG. 13, the brushless motor 51 defines a first end or a front end 602 which is adjacent to the saw blade arranged along the extending direction of the motor shaft 511 and a second end or a rear end 604 which is far away from the saw blade and opposite to the first end 602. The brushless motor 51 further defines a front side 609, an area of which is located perpendicular to the extension direction of the motor shaft 511 and parallel to the cutting direction of the saw blade, and a rear side which is opposite to the front side 609. In this example, the saw blade and the base plate 54 is located on the front end 602 of the motor 51, and the printed circuit board 55 and the motor driving circuit 106 are located on the front side 609 of the motor 51. Referring to FIGS. 10-14, the circuit board 55 is not located on the rear end 604 of the motor shaft 511, but is disposed at the front side 609 of the motor 51. The handle 12 of the power tool is located on the center or close to the center of the power tool so as to balance the center of gravity of the power tool during operation thereof, so the user will have a better feel when the user operates the power tool by gripping the handle of the power tool.

Figure 14:
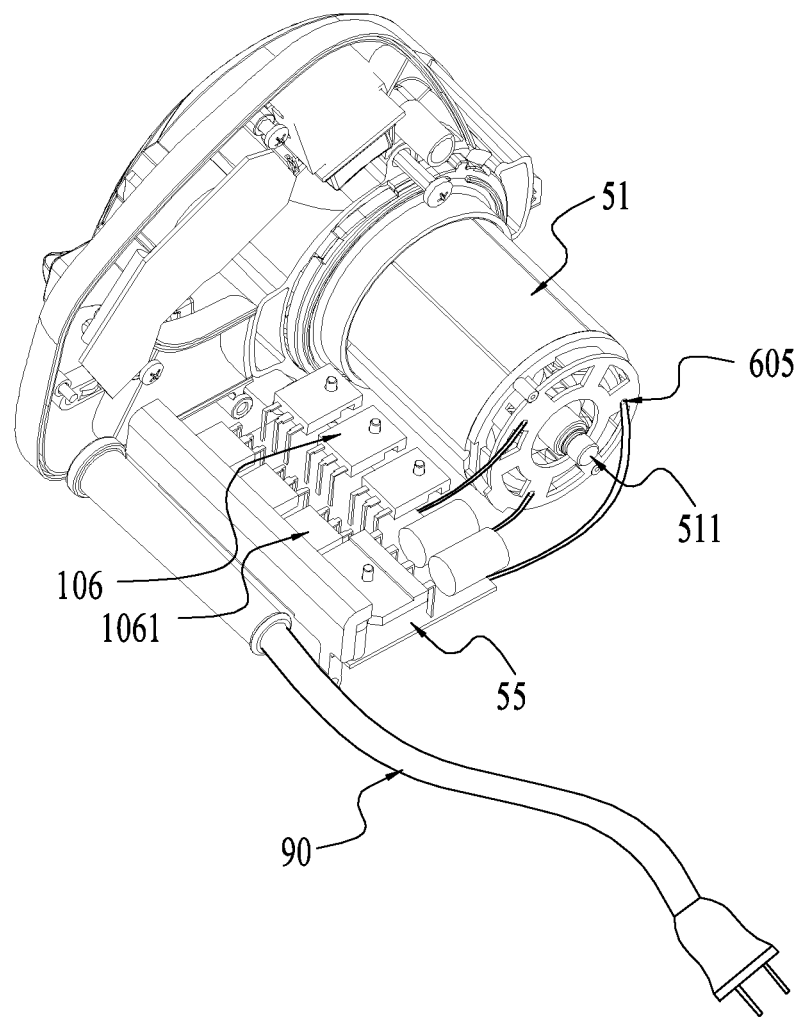
FIG. 14 is another schematic view the power tool in FIG. 13.

In this example, the power tool includes a power plug 90 for connecting with an AC power supply. The plug 90 can receive AC power input of 85-265V. Compared with DC power of 12-60V, AC power of 85-265V is a high voltage input. The high voltage input requires a high precision about the position detecting of the motor. In the prior art, for example by a sense way, such as the electromagnetic induction element, the photoelectric element, the photoelectric encoder, the position sensing board, the position sensor and/or the other sense elements are used to detect the position of the motor. In one aspect, the detecting accuracy of the prior art is not sufficient, and in the other aspect, the position sensing board, the position sensor or the other sense elements are greatly affected by the temperature and cannot work well at a place having an extreme temperature, for example a temperature of less than 40 degrees. However, in other examples, the power tool does not use the AC power plug, but uses a battery power supply outputting power of at least 56V, preferably 85-265V. For the power tool with a high power output requirement, multiple battery packs are used to supply the power, for example at least two battery packs. The multiple battery packs can output DC current of at least 56V, preferably 85-265V. One handle or two handles of the power tool is disposed close to the center of the power tool so as to balance the position of the center of the power tool during the operation thereof, so the user will have a good feeling when operating the power tool by gripping the handle or handles thereof. As shown in FIG. 13, in this example, the motor driving circuit 106 includes switch elements 1061 for actuating or driving the motor. The motor driving circuit 106 is mounted onto the circuit board 55. The circuit board 55 along the cutting direction is disposed at the front side 609, an area of which is located between the motor 51 and the handle 12. In the prior art as described in US2017/0110935A1 employing the sense magnet and/or positional sensor board, the influence of armature reaction thereof can greatly affect the performance of the motor. That is, in this example, there is no sense magnet and/or positional sensor board within 10 mm of the front end and rear end of the rotor of the motor. In an example of the present invention, as shown in FIGS. 13 and 14, the phase windings 605 of the stator of the motor are linked or wired to the circuit board 55 by the phase wires or lines as shown in FIGS. 13 and 14 to detect the terminal voltage signals and/or current signals from the phase windings 605 or wires of the motor so as to determine the position of the rotor of the motor. Thus, the influence of armature reaction can be greatly reduced due to having no sense magnet and/or positional sensor board.

The motor 51 leads out at least three phase wires or lines which are electrically connected with the at least three stator or phase windings 605 of the stator. The at least three phase wires of the motor 51 are directly and electrically connected to the circuit board 55 including the controller 140 therein. Referring to FIGS. 13-14, in this example, the motor 51 includes the rotor and the stator having the at least three stator windings 605 corresponding to at least three phases of the motor. The motor 51 leads out the at least three phase wires, corresponding to the at least three stator windings, electrically connected with the at least three stator windings 605 of the stator and contacts or metal pads on the surface of the circuit board 55. That is, each of the at least three phase wires has thereof one end electrically connected to each of the at least three stator windings of the stator of the motor, and the other end soldered or electrically connected to the corresponding metal pad of the circuit board 55. In other examples, the stator of the BLDC motor or motor 51 may include fewer than or more than three phases windings. It should be noted that the motor 51 has no other wires or lines except for the above-described phase wires extending from the corresponding phase windings 605 of the stator of the motor. Compared with prior power tools that use the sense magnets and/or the positional sensor board, there is provided with a few phase wires for directly and electrically connecting three stator or phase windings 605 of the motor and the circuit board 55 with no other wires or lines extending from the motor of the power tool. In other examples, the controller can directly or indirectly obtain the terminal voltage signals and/or current signals from the corresponding phase windings 605 of the stator to determine the position of the rotor of the motor not via the entity wires or lines. Thus, in the subject example there is no sense magnet and/or the positional sensor board as the prior art described in US2017/0110935A1 or US2017/0126051A1. Without the sense magnet and/or the positional sensor board, the subject example can greatly reduce to the motor the influence of armature reaction, which was mostly generated by the sense magnet and/or the positional sensor board. Further, due to having no sense magnet and/or positional sensor board, the subject example can output a higher voltage by providing a compact structure for the power tool with a lower cost as compared to the prior art.

Figure 15:
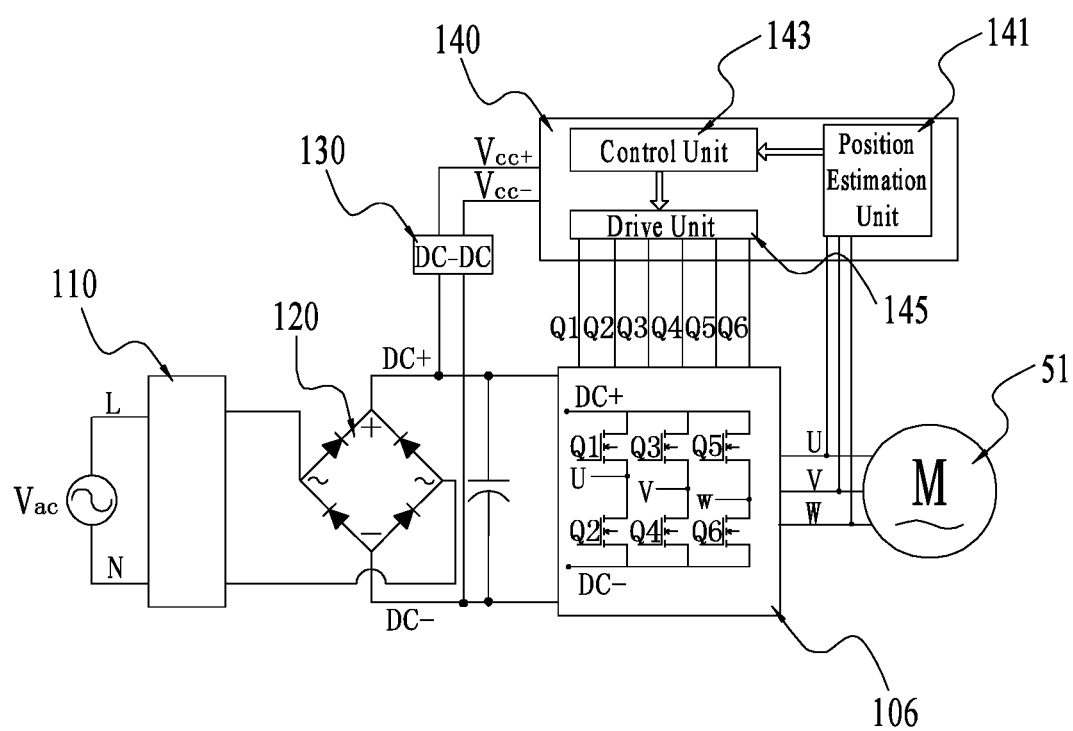
FIG. 15 is a circuit diagram of the power tool in FIG. 10.

The circuit board 55 includes the controller or control chip 140 embedded therein. The phase wires for carrying the terminal voltage signals and/or current signals directly from the corresponding phase windings 605 of the stator of the motor will send the terminal voltage signals and/or current signals to the controller 140. In other words, the phase wires are configured to output the terminal voltage signals and/or current signals into the controller 140. In this embodiment, the controller 140 includes a position estimation unit 141, a control unit 143, and a drive unit 145. The position estimation unit 141 is configured to estimate or determine the position of the rotor of the motor based on the outputted terminal voltage signals and/or current signals from the phase wires of the motor. The control unit 143 is configured to receive the estimated or determined position of the rotor of the motor and accordingly generate a control command to the drive unit 145. Upon the receipt of the control command, the drive unit is configured to output a drive signal to the motor driving circuit 106 so as to drive the motor. That is, the phase wires are configured to directly and electrically connect the stator or phase windings 605 of the stator of the motor with the circuit board 55 including the controller 140 and output the terminal voltage signals and/or current signals from the corresponding phase windings 605 of the stator of the motor to the controller 140, the controller 140 is configured to obtain the outputted terminal voltage signals and/or current signals to estimate or determine the position of the rotor of the motor and generate a control command to the motor driving circuit 106, which is set to drive the motor by producing phase or phase-changing signals to control the motor 51. Note that the controller 140 is to obtain the terminal voltage of the phase line to estimate the position of the rotor of the motor, and the terminal voltage is defined by difference of the phase line voltage and DC-voltage as shown in FIG. 15. The terminal voltage relates to the counter electromotive force, but not equal to the counter electromotive force as defined by the potential of two phase lines, such as the phase line U and the phase line V. That the controller employing the terminal voltage of the phase line but not the counter electromotive force of the phase lines is because of the potential of two phase lines cannot be accurately obtained when the motor runs or rotates. In this example, the position estimation unit 141, the control unit 143, and the drive unit 145 are integrated into a common board 55, with the motor driving circuit 106 including six switching elements mounted onto the circuit board 55 as shown in FIG. 13 and FIG. 15.

As shown in FIG. 15, a circuit diagram of the power tool is shown without the sense magnet and/or the positional sensor board as in the prior art. The AC power supply plug of the power tool preferably receives the AC power input of 110-230V and an EMI element 101 is provided for filtering the AC power. The EMI element 101 is mainly constituted by a X capacitor, a Y capacitor and a common mode inductor. Then the AC power is converted to DC power through an AC/DC converter 120 that is a single phase uncontrolled rectifier bridge. The capacitor can filter the DC current. A part of the DC current flows to the motor driving circuit 106 that is a three-phase power circuit, which outputs a power source to the motor 51. The other part of the DC current generates Vcc power via a power conversion circuit 130 to supply power to the controller 140. The motor driving circuit 106 is a three-phase power circuit which connects with the three-phase DC brushless motor 51 via the three phase lines U, V, and W.

A control logic for the circuit diagram in FIG. 15 is described as below. The controller using an analog-digital conversion module with an AD sampling interface adapted for receipt of the terminal voltage signals and/or current signals from the three phase lines U, V, and W of the brushless motor, is configured to determine the position of the rotor of the motor based on the terminal voltage signals and/or current signals of the phase wires of the motor through a position estimation unit 141 and output a drive signal to the motor driving circuit 106, which then generates the phase signals to the motor. The position estimation unit 141 is preferably a software program in this example. The control program of the control unit 143 can generate six logic signals to the driving unit 145. The logic signals can be amplified through the driving unit 145, which generates six drive signals Q1, Q2, Q3, Q4, Q5, and Q6 to drive the motor driving circuit 106. That is, the motor driving circuit 106 includes six switching elements, which are turned on or off to generate the phase signals to control the motor via the three phase lines U, V, and W.

Figure 16:
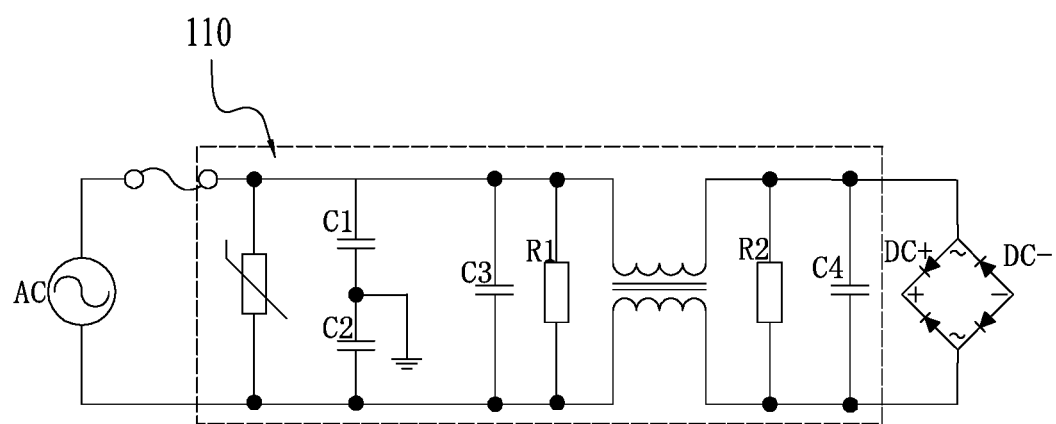
FIG. 16 is a circuit diagram of an EMI element of the power tool in FIG. 15.

As shown in FIG. 16, a circuit diagram of the EMI element is shown. When the power tool adapted for receipt of the AC power supply of 110-230V works, there are the switching elements with thereof the frequent ON and OFF operation, which can cause a voltage jump or a current jump and generate a common mode interference and a differential mode interference. In order to reduce the influence to the power grid and the electronic devices by the mode interference, it is needed to use the EMI element in FIG. 16. The EMI element comprises a resistor-capacitor unit meets the safety requirements. In the circuit diagram of FIG. 16, a fuse acts as an over-current protector for the power tool. A piezo resistor acts as a voltage protector, which is able to reduce the influence to the circuit due to the voltage jump of the AC power input. The two Y capacitors C1, C2 are able to restrain the common mode interference and guide the signal of the common mode interference to the ground. The two X capacitors are able to restrain the differential mode interference. The common mode inductor can only restrain the common mode interference current, and can't affect the normal working current.

Figure 17:
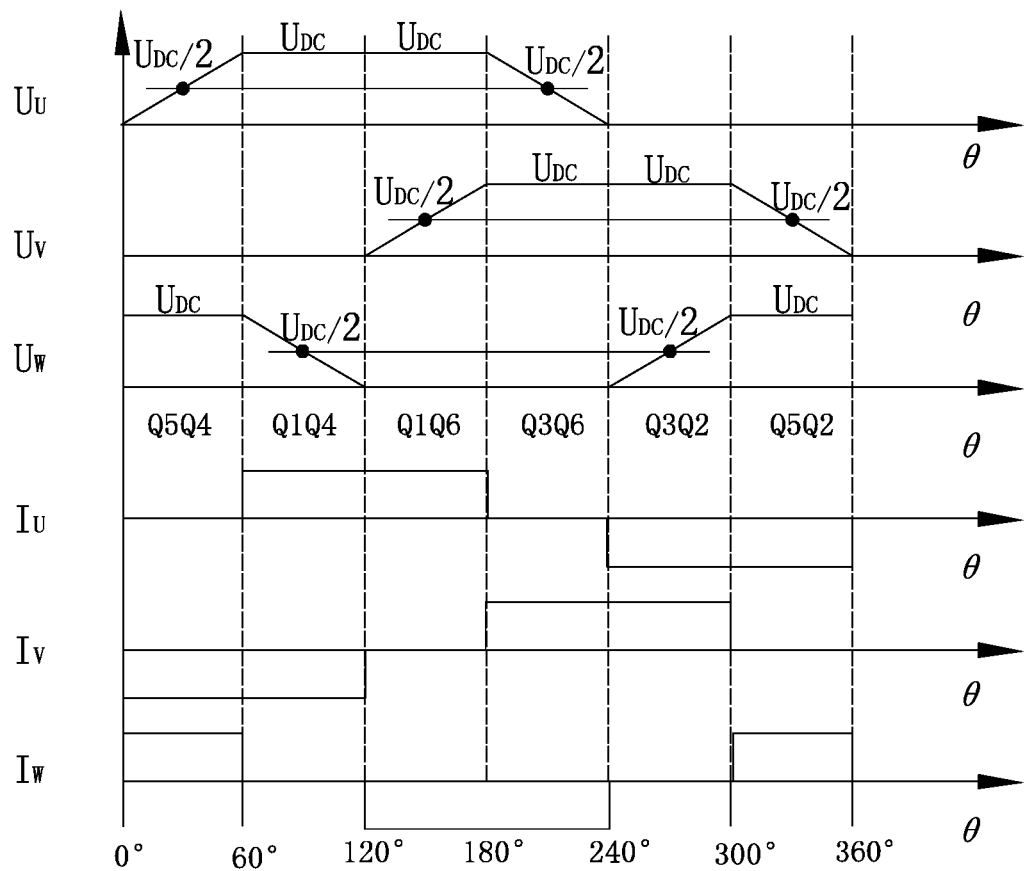
FIG. 17 is a schematic diagram of phase changing of a brushless motor of the power tool.

An example of a principle for changing phase of the brushless motor is shown in FIG. 17. The three-phase BLDC is configured to employ six-beat control. That is a 360° electric cycle is divided into six 60° areas. Each area has two phase windings 605 at work. One phase is connected with positive current, and the other is connected with negative current. Taking the 0-60° area as example, as the motor driving circuit 106 includes six switch elements or tubes Q1, Q2, Q3, Q4, Q5, and Q6, during this area, the switch elements Q5 and Q4 are turned on, and the other switch elements are turned off. At this moment, the phase line V does pass the negative current, and the phase line W does pass the positive current. The respective terminal voltages of the three phase lines U, V, and W run as follows: the terminal voltage of the phase line V is 0, the terminal voltage of the phase line W is $U_{DC}$, the phase line U acts as a floated phase, and the terminal voltage signal and/or the current signal is detected, wherein the terminal voltage is defined by the difference of the corresponding phase line U, V, and W voltage and DC-voltage as shown in FIG. 15. The oblique line ($U_{DC}/2$+ count EMF of phase U), and $U_{DC}/2$ is chosen as a key signal position, which is outputted to the position estimation unit 141 of the controller 140. At this moment, the counter voltage of the phase line U is 0, and the phase changing time of the next area can be obtained by delaying 30° electrical angle. When the phase changing time of the next area is reached, the switch elements Q5 and Q4 of the motor driving circuit 106 are switched to switch elements Q1 and Q4, and the phase lines U and W then work and the terminal voltage signal and/or the current signal of the phase line V is detected so as to obtain the time at which the terminal voltage $U_{DC}/2$ arises on the phase line V, and the next phase changing time of another area can be obtained by delaying another 30° electrical angle. And so on, the drive of the phase changing of the motor can be realized as described above, and the motor can be driven to rotate as normal.

The power tool in this example employs the alternating current or AC power plug 90, which is able to receive the AC input of 85-265V, preferably 110-230V. In other examples, the power tool may use a high voltage DC power, for example a high voltage DC power composed of one or more battery packs which can output the voltage of at least 56V.

The power tool configured to employ such a high voltage brushless motor of the second embodiment has no need of the sense magnet, the position sensor, and/or the position sensor board to obtain the position of the motor. Thus, the detecting accuracy of the position of the motor is improved, and the influence of armature reaction to the motor is greatly reduced due to having no sense magnet and/or position sensors, and the cost is reduced.

The above illustrates and describes basic principles, main features and advantages of the invention hereinafter claimed. Those skilled in the art should appreciate that the above described examples do not limit the claimed invention in any form. Technical solutions obtained by equivalent substitution or equivalent variations all fall within the scope of the claimed invention.

What is claimed is:

1. A power tool, comprising:
a housing;
a saw blade for cutting a workpiece;
a motor for driving the saw blade to rotate about a first axis, wherein the saw blade is disposed at a front side of the motor;
a circuit board for controlling the motor;
a heat sink for cooling; and
a base plate being formed with a flat surface for contacting with the workpiece during cutting,
wherein the housing comprises a first containing portion and a second containing portion, the first containing portion is formed with a first container for containing the motor, the second containing portion is formed with a second container which is communicated with the first container, the first containing portion has two ends along a direction perpendicular to the first axis, the second containing portion extends from one of the two ends of the first containing portion along a direction parallel to the flat surface, the circuit board and the heat sink are disposed in the second container, and
wherein the heat sink comprises a base board extending along the direction parallel to the flat surface, a plurality of first-type ribs disposed on a first surface of the base board and a plurality of second-type ribs disposed on the first surface, the first surface extends along the direction parallel to the flat surface, a first-type channel is formed between two adjacent first-type ribs, one end of the first-type channel is defined as a first-type air outlet, a second-type channel is formed between two adjacent second-type ribs, one end of the second-type channel is defined as a second-type air outlet, the extending direction of the first-type ribs is parallel to the extending direction of the second-type ribs, the first container comprises a first area for placing the motor and a second area disposed at a rear side of the motor, the first-type air outlet is open towards the second area, a first airflow from the first-type air outlet flows to the second area and then to the first area, the second-type air outlet is open towards the first area, the end of the second-type ribs close to the motor is shorter than the end of the first-type ribs close to the motor so that a guiding channel is formed between the second-type air outlet and the motor, and the guiding channel guides a second airflow from the second-type air outlet flows to the second area.

2. The power tool of claim 1, wherein the second containing portion is disposed at a center of the motor in a direction perpendicular to the flat surface.

3. The power tool of claim 1, wherein the second containing portion is aligned with the first containing portion on an end that is removed from the saw blade in a direction parallel to the first axis.

4. The power tool of claim 1, wherein the housing comprises a handle portion for a user to grip, the handle portion and the first containing portion forming a hole to allow a hand of the user to pass through the hole so as to grip the handle portion and a projection of the second containing portion on a plane perpendicular to the first axis is located out of a projection of the hole on the plane.

5. The power tool of claim 1, wherein a distance from the second containing portion to the flat surface is greater than or equal to 8 mm and less than or equal to 30 mm in a direction perpendicular to the flat surface.

6. The power tool of claim 1, wherein the circuit board is disposed on one side of the heat sink in the direction perpendicular to the flat surface and the circuit board comprises a circuit substrate extended in the direction parallel to the flat surface, a first-type electronic element having a heating power which is greater than or equal to a predetermined heating power, a second-type electronic element having a heating power which is less than the predetermined heating power, the first-type electronic element is disposed on a position of the circuit substrate which is corresponded with the first-type ribs, and the second-type electronic element is disposed on a position of the circuit substrate which is corresponded with the second-type ribs.

7. The power tool of claim 1, wherein the housing comprises a first connecting element allowing the housing to rotatably connect with the base plate about a second axis which is parallel to the first axis, the base plate is connected or formed with a second connecting element for engaging with the first connecting element so as to connect the base plate to the first connecting element, one of the first connecting element and the second connecting element is formed with grooves, and the other of the first connecting element and the second connecting element is formed with bulges being capable of inserting in the grooves.

8. The power tool of claim 7, wherein the number of the grooves is two and the number of the bulges is two.

9. The power tool of claim 1, wherein the housing comprises a handle portion for a user to grip, an auxiliary gripping portion allowing the user to grip with the other hand when the user grips the handle portion with one hand, and the auxiliary gripping portion and the motor are located on two sides of the handle portion in the direction parallel to the first axis.

10. The power tool of claim 9, wherein the housing comprises a guard for partially surrounding the saw blade and the auxiliary gripping portion is at least partially located on one side of the guard that is far from the motor in the direction parallel to the first axis.

11. The power tool of claim 9, wherein the auxiliary gripping portion has a size in the direction parallel to the first axis which is greater than or equal to 10 mm and less than or equal to 30 mm.

12. The power tool of claim 9, wherein the auxiliary gripping portion has a size in the direction parallel to the flat surface and perpendicular to the first axis which is greater than or equal to 10 mm and less than or equal to 40 mm.

13. The power tool of claim 9, wherein the auxiliary gripping portion and the handle portion are disposed on two sides of the saw blade in the direction parallel to the first axis.

* * * * *